(12) United States Patent
Xiao et al.

(10) Patent No.: US 11,460,704 B2
(45) Date of Patent: Oct. 4, 2022

(54) AUGMENTED REALITY APPARATUS AND OPTICAL SYSTEM THEREFOR

(71) Applicant: Matrixed Reality Technology Co., Ltd., Wuxi (CN)

(72) Inventors: Bing Xiao, Beijing (CN); Xiaobin Liang, Beijing (CN); Chi Xu, Beijing (CN)

(73) Assignee: Matrixed Reality Technology Co., Ltd., Wuxi (CN)

( * ) Notice: Subject to any disclaimer, the term of this patent is extended or adjusted under 35 U.S.C. 154(b) by 0 days.

(21) Appl. No.: 17/326,014

(22) Filed: May 20, 2021

(65) Prior Publication Data

US 2021/0271100 A1    Sep. 2, 2021

Related U.S. Application Data

(63) Continuation of application No. 16/930,000, filed on Jul. 15, 2020, now Pat. No. 11,042,040, which is a
(Continued)

(30) Foreign Application Priority Data

Feb. 12, 2018   (CN) .......................... 201810146738.7
Feb. 12, 2018   (CN) .......................... 201810146751.2
(Continued)

(51) Int. Cl.
  *G03B 21/14*    (2006.01)
  *G02F 1/1335*   (2006.01)
  (Continued)

(52) U.S. Cl.
  CPC ....... *G02B 27/0172* (2013.01); *G02B 27/017* (2013.01); *G02B 1/11* (2013.01);
  (Continued)

(58) Field of Classification Search
  CPC ...... G02B 27/283; G02B 27/01; G02B 27/10; G02B 27/0101; G02B 27/0172; G02B 27/123; G02B 27/286; G06K 9/00671
  (Continued)

(56) References Cited

U.S. PATENT DOCUMENTS 6,215,593 B1   4/2001   Bruce
7,733,572 B1   6/2010   Brown et al.
(Continued)

FOREIGN PATENT DOCUMENTS

CN   1664649 A   9/2005
CN   1743891 A   3/2006
(Continued)

OTHER PUBLICATIONS

Richard D. Hudson, Infrared System Engineerings,1969, John Wiley & Sons, Inc.
(Continued)

*Primary Examiner* — William C. Dowling
(74) *Attorney, Agent, or Firm* — Reinhart Boerner Van Deuren P.C.

(57) ABSTRACT

Provided are an optical system for an augmented reality apparatus and an augmented reality apparatus. The optical system includes an image source; a polarizing beam splitter including a polarizing beam splitting film and a polarizing film; a polarizer disposed between the image source and the beam splitting side of the polarizing beam splitter; a wave plate adjacent to the beam splitting side; a semi-reflector located downstream of the wave plate in an optical path of the reflected light; and an additional wave plate and an additional polarizer which are sequentially located distal to the semi-reflector. The image source has a planar image source for emitting light, wherein a plane where the beam splitting side of the beam splitter component locates is at a
(Continued)

first angle (β) relative to a normal of the image source, the first angle has a value between 11° and 79°.

20 Claims, 8 Drawing Sheets

Related U.S. Application Data continuation-in-part of application No. PCT/CN2019/074852, filed on Feb. 12, 2019.

(30) Foreign Application Priority Data

| Feb. 12, 2018 | (CN) | 201810146905.8 |
|---|---|---|
| Feb. 12, 2018 | (CN) | 201810146912.8 |
| Feb. 12, 2018 | (CN) | 201810146915.1 |
| Feb. 12, 2018 | (CN) | 201810147325.0 |
| Feb. 12, 2018 | (CN) | 201810147326.5 |
| Feb. 12, 2018 | (CN) | 201810147328.4 |
| Feb. 12, 2018 | (CN) | 201810147330.1 |
| Feb. 12, 2018 | (CN) | 201810147332.0 |
| Feb. 12, 2018 | (CN) | 201810147336.9 |

(51) Int. Cl.

| H04N 9/77 | (2006.01) |
|---|---|
| G02B 27/01 | (2006.01) |
| G02B 27/12 | (2006.01) |
| G02B 27/28 | (2006.01) |
| G02B 1/11 | (2015.01) |
| G02B 27/09 | (2006.01) |
| G02B 27/14 | (2006.01) |

(52) U.S. Cl.
CPC ...... *G02B 27/0101* (2013.01); *G02B 27/0955* (2013.01); *G02B 27/123* (2013.01); *G02B 27/142* (2013.01); *G02B 27/145* (2013.01); *G02B 27/281* (2013.01); *G02B 27/283* (2013.01); *G02B 27/286* (2013.01); *G02B 2027/013* (2013.01); *G02B 2027/0118* (2013.01); *G02B 2027/0178* (2013.01); *G02B 2027/0185* (2013.01)

(58) Field of Classification Search
USPC .......................................................... 353/20
See application file for complete search history.

(56) References Cited

U.S. PATENT DOCUMENTS

| 2003/0169405 A1 | 9/2003 | Agostinelli et al. |
|---|---|---|
| 2006/0131492 A1 | 6/2006 | Kobayashi et al. |
| 2009/0109678 A1 | 4/2009 | Hsu et al. |
| 2010/0290127 A1 | 11/2010 | Kessler et al. |
| 2014/0240843 A1 | 8/2014 | Kollin |
| 2015/0301336 A1 | 10/2015 | Denefle et al. |
| 2015/0378074 A1 | 12/2015 | Kollin et al. |
| 2016/0320559 A1 | 11/2016 | Richards |
| 2020/0103659 A1 | 4/2020 | Ouderkirk et al. |
| 2020/0348521 A1 | 11/2020 | Xiao et al. |
| 2020/0348522 A1 | 11/2020 | Xiao et al. |
| 2020/0348531 A1 | 11/2020 | Popovich et al. |
| 2020/0371368 A1 | 11/2020 | Liang et al. |

FOREIGN PATENT DOCUMENTS

| CN | 101418927 A | 4/2009 |
|---|---|---|
| CN | 101881887 A | 11/2010 |
| CN | 102540465 A | 7/2012 |
| CN | 202433604 U | 9/2012 |
| CN | 103207426 A | 7/2013 |
| CN | 203277499 U | 11/2013 |
| CN | 105093556 A | 11/2015 |
| CN | 205539729 U | 8/2016 |
| CN | 106019591 A | 10/2016 |
| CN | 206563849 U | 10/2017 |
| CN | 107422480 A | 12/2017 |
| CN | 107422481 A | 12/2017 |
| CN | 107589546 A | 1/2018 |
| CN | 108319019 A | 7/2018 |
| EP | 1024388 A2 | 8/2000 |
| GB | 1282425 A | 3/1969 |
| JP | H0659217 A | 3/1994 |
| JP | H09304730 A | 11/1997 |
| JP | H10311963 A | 11/1998 |
| JP | H11237584 A | 8/1999 |
| JP | H11308640 A | 11/1999 |
| JP | H11326818 A | 11/1999 |
| JP | 2002122806 A | 4/2002 |
| JP | 2002148559 A | 5/2002 |
| JP | 2005077840 A | 3/2005 |
| JP | 2008533517 A | 8/2008 |
| JP | 2017514168 A | 6/2017 |
| JP | 2017120311 A | 7/2017 |
| WO | WO 2012/118573 A1 | 9/2012 |

OTHER PUBLICATIONS

Rufolf Kings Lake, Lens Design Fundamentals, 1978, Academic Press, Inc.

AUGMENTED REALITY APPARATUS AND OPTICAL SYSTEM THEREFOR

CROSS-REFERENCE TO RELATED PATENT APPLICATIONS

This patent application is a continuation of U.S. patent application Ser. No. 16/930,000, filed on Jul. 15, 2020 and titled "Augmented Reality Apparatus and Optical System Therefor", which is a continuation-in-part of co-pending PCT Application No. PCT/CN2019/074852, filed Feb. 12, 2019, and claims the benefit of the following: Chinese patent application No. 201810146738.7 filed on Feb. 12, 2018; Chinese patent application No. 201810146751.2 filed on Feb. 12, 2018; Chinese patent application No. 201810146912.8 filed on Feb. 12, 2018; Chinese patent application No. 201810146905.8 filed on Feb. 12, 2018; Chinese patent application no. 201810147326.5 filed on Feb. 12, 2018; Chinese patent application No. 201810147336.9 filed on Feb. 12, 2018; Chinese patent application no. 201810147325.0 filed on Feb. 12, 2018; Chinese patent application no. 201810146915.1 filed on Feb. 12, 2018; Chinese patent application No. 201810147330.1 filed on Feb. 12, 2018; Chinese patent application No. 201810147332.0 filed on Feb. 12, 2018; and Chinese patent application No. 201810147328.4 filed on Feb. 12, 2018. The disclosures of the aforementioned applications are hereby incorporated by reference in their entireties.

FIELD

The present application relates to an augmented reality apparatus, especially a head-mounted augmented reality apparatus. The present application also relates to an optical system for the augmented reality apparatus.

BACKGROUND

Augmented reality (AR) technology can be called as mixed display technology. Its principle is that an image source controllable by a computer is used to present an image, which is displayed for a user; to the eyes of the user, and the presented image is superposed with a real environmental image which can be directly seen by the eyes of the user so that real scene information augmented with the image presented via the computer is provided for the user. This kind of technology plays an increasingly important role in facilitating design and development of industrial products by designers.

For a head-mounted augmented reality apparatus, it is usually in the form of AR glasses or a helmet. Therefore, when the AR glasses or helmet is worn, unwanted light in various directions, in addition to light information from the image source and ambient light information, can enter into a human eye. Such unwanted light may affect the image quality and scene observation of the human eye and thus shall be eliminated as much as possible.

SUMMARY

In order to solve the issues mentioned above, the present application is aimed at proposing an optical system used for an augmented reality apparatus such that the augmented reality apparatus's image quality cannot be affected by any undesired light.

In one aspect of the present application, an optical system for an augmented reality (AR) apparatus is provided, which optical system comprises:

an image source;
a beam splitter component having a beam splitting side adjacent to the image source and a transmission side facing away from the image source;
a wave plate adjacent to the beam splitting side, the beam splitter component being arranged in such a way that light emitted from the image source is able to be non-perpendicularly incident on the beam splitting side and at least partially reflected toward the wave plate; and
a semi-reflector located downstream of the wave plate in an optical path of the reflected light,
wherein the beam splitter component is configured in such a way that when the light emitted from the image source is incident on the beam splitting side, a polarized light component, whose polarization is in a first direction, passes through the beam splitter component to be transmitted through the transmission side, and a polarized light component, whose polarization is in a second direction perpendicular to the first direction, is reflected by the beam splitting side toward the wave plate, and wherein the beam splitter component is also configured in such a way that when light is incident on the transmission side, a polarized light component of the light polarized in the first direction is able to pass through the beam splitter component to be transmitted through the beam splitting side, and a polarized light component of the light polarized in the second direction is able to be absorbed in the beam splitter component, wherein the wave plate is preferably a quarter-wave plate. Therefore, the energy of a part of the light emitted from the image source entering a human eye of a user is relatively increased and unwanted light, except for scene and ambient lights, entering the human eye can be blocked or eliminated, such that the image quality and sharpness can be improved and thus the power consumption of the AR apparatus can be saved.

Optionally, the beam splitter component comprises a polarizing beam splitting film and a polarizing film, wherein the polarizing beam splitting film is configured in such a way that light polarized in the first direction is allowed to be transmitted therethrough and light polarized in the second direction is reflected, wherein the polarizing film is configured in such a way that light polarized in the first direction is allowed to be transmitted therethrough and light polarized in the second direction is absorbed, and wherein viewed in a direction of the light emitted from the image source, the polarizing beam splitting film is located upstream of the polarizing film to define the beam splitting side. Therefore, the polarized light component in the second direction can be ensured to be reflected by the polarizing beam splitting film and subsequently to be processed by the wave plate or the quarter-wave plate and the semi-reflector for entry into the human eye of the user for imaging therein.

Optionally, the transmission side is defined by the polarizing film such that the utilization efficiency of light energy can be enhanced.

Optionally, the beam splitter component also comprises a splitter substrate, wherein the splitter substrate is located between the polarizing beam splitting film and the polarizing film, such that the overall structural strength of the beam splitter component can be increased.

Optionally, the beam splitter component also comprises a splitter substrate, wherein the polarizing film is located between the splitter substrate and the polarizing beam splitting film, and wherein the transmission side is defined by the splitter substrate, such that the overall structural strength of the beam splitter component can be increased.

Optionally, the beam splitter component also comprises a splitter substrate, wherein the polarizing beam splitting film is located between the splitter substrate and the polarizing film, and wherein the transmission side is defined by the polarizing film such that the overall structural strength of the beam splitter component can be increased.

Optionally, the beam splitter component also comprises a retarder film, wherein the polarizing film is located between the retarder film and the polarizing beam splitting film, such that stray light and "interference of ghost" effects can be eliminated or weakened and the utilization efficiency of light energy can be improved. The retarder film is preferably a quarter-retarder film.

Optionally, the beam splitting side is defined by the polarizing beam splitting film, and wherein the transmission side is defined by the retarder film, such that stray light and "interference of ghost" effects can be eliminated or weakened and the utilization efficiency of light energy can be improved.

Optionally, the beam splitter component also comprises a splitter substrate, wherein the retarder film and the polarizing film are located between the splitter substrate and the polarizing beam splitting film, and wherein the transmission side is defined by the splitter substrate, such that stray light and "interference of ghost" effects can be eliminated or weakened and the overall structural strength of the beam splitter component can be increased.

Optionally, the beam splitter component also comprises a splitter substrate, wherein the splitter substrate and the polarizing film are located between the retarder film and the polarizing beam splitting film, and wherein the transmission side is defined by the retarder film, such that stray light and "interference of ghost" effects can be eliminated or weakened and the overall structural strength of the beam splitter component can be increased.

Optionally, the beam splitter component also comprises a splitter substrate, wherein the polarizing beam splitting film is located between the polarizing film and the splitter substrate, such that stray light and "interference of ghost" effects can be eliminated or weakened and the overall structural strength of the beam splitter component can be increased.

Optionally, the image source comprises a planar image source for emitting light, wherein a plane where the beam splitting side of the beam splitter component locates is at a first angle relative to the normal of the image source, which first angle has a value between 11° and 79°, preferably between 20° and 70°, more preferably between 30° and 60°, more preferably between 40° and 55°, most preferably between 40° and 50°; and/or, wherein a plane where the beam splitting side of the beam splitter component locates is at a second angle relative to an optical axis of the semi-reflector, in which 0<the second angle <90° and the first angle −10°≤the second angle≤the first angle+10°.

Optionally, the wave plate is integrated together with the semi-reflector, such that the volume of the whole system can be decreased. Further, such integration can reduce the number of reflective interfaces, such that stray light for the whole optical system and "ghost" effects can be eliminated or weakened and the contrast of the optical system can be improved.

In another aspect of the present application, an augmented reality apparatus, especially a head-mounted augmented reality apparatus is provided, which apparatus comprises a frame and the already mentioned optical system integrated in the frame.

Optionally, the frame is a spectacle frame.

Using the inventive technical means, any influence of unwanted light, except for scene and ambient lights, on the image quality of the optical system can be eliminated or weakened, such that a user can watch imaging more clearly and without disturbance. Furthermore, any effect of stray light on the image quality is eliminated or weakened.

BRIEF DESCRIPTION OF THE DRAWINGS

The foregoing and other aspects of the present application can be well understood by the following detailed description in combination with the attached drawings. It should be noted that the drawings may be given in different scales for purpose of clarity, which however does not affect understanding to the present application. In the drawings:

FIG. 3b is an enlarged view schematically illustrating a beam splitter component of the optical system according to an embodiment of the present application, which is used in FIG. 3a;

FIG. 4b is an enlarged view schematically illustrating a beam splitter component of the optical system according to an embodiment of the present application, which is used in FIG. 4a;

DETAILED DESCRIPTION

Figure 1:
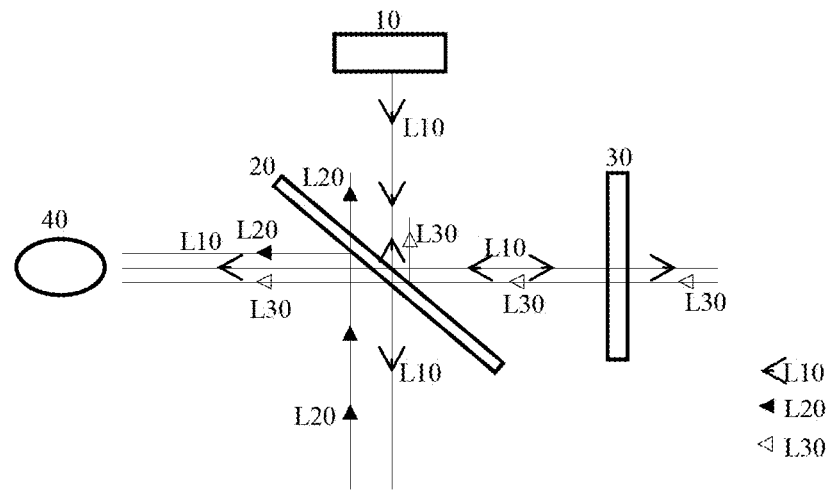
FIG. 1 is a view schematically illustrating an optical system of an AR apparatus according to the prior art.

In the drawings of the present application, those features having the same configuration or similar function are represented by the same reference numerals.

FIG. 1 schematically illustrates an optical path diagram of an optical system of an AR apparatus according to the prior art. The optical system of the AR apparatus according to the prior art generally comprises an image source 10 controllable by a computer (not shown), a splitter 20 and a semi-reflector 30. Under control of the computer, the image source 10 can respectively emit light L10 to exhibit a desired image. Along the light L10 emitted from the image source, the splitter 20 is arranged downstream of the image source 10. One part of the light L10 emitted from the image source is reflected by the splitter 20, and the other part of the light emitted from the image source is transmitted through the splitter 20. Along an optical path of the reflected light of the light L10 emitted from the image source, the semi-reflector 30 is arranged downstream of the splitter 20. The reflected light of the light L10 emitted from the image source is partially transmitted outwards through the semi-reflector 30 and is partially reflected by the same semi-reflector, wherein the reflected part of the light partially passes through the splitter 20 again to be observed by a human eye. At the same time, ambient light L30 can respectively pass through the semi-reflector 30 and then partially through the splitter 20 to be seen by the human eye 40. Therefore, an image presented by a portion of the light L10 emitted from the image source and an environmental image presented by the ambient light L30 are superposed in the human eye 40 such that a user can experience an augmented reality effect for real scene. In the above optical system according to the prior art, in order to ensure that the part of the light LI 0 emitted from the image source being transmitted through the splitter 20 will not be returned back again to affect imaging, it is necessary to enable that part of the light L10 emitted from the image source to unimpededly exit to the surrounding environment. This will result in that incidence of unwanted light L20 can occur from a side of the splitter 20 opposing the image source 10. Therefore, a portion of the unwanted light L20 can be reflected by the splitter 20 toward the human eye 40, which may affect observation effect of the user.

Figure 2:
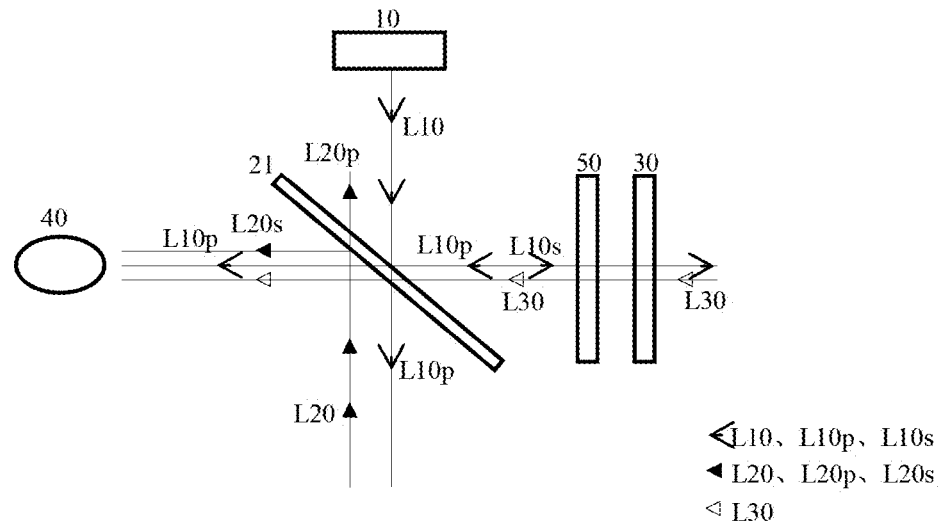
FIG. 2 is a view schematically illustrating an optical system of the AR apparatus, which optical system has been modified with respect to that of FIG. 1.

In order to increase the energy utilization efficiency of the light L10 emitted from the image source, an optical system of the AR apparatus shown by FIG. 2 has been proposed. For clarity, only features of the optical system of the AR apparatus that are different than the optical system shown by FIG. 1 will be explained below; regarding other elements, one can refer to the already-explained contents. As shown by FIG. 2, the optical system of the AR apparatus comprises a polarizing beam splitter 21 in place of the splitter 20. For instance, the polarizing beam splitter can be made by applying a polarizing beam splitting film on a (non-polarizing) splitter substrate. The polarizing beam splitter 21 is arranged in such a way that its polarizing beam splitting film is adjacent to the image source 10. The splitter substrate can achieve the same function as the splitter 20 shown by FIG. 1. The polarizing beam-splitter film is used to enable polarized light, whose polarization is in a first direction, to pass therethrough and polarized light, whose polarization is in a second direction perpendicular to the first direction, to be reflected thereby. For the purpose of clear description, the polarized light whose polarization is in the first direction and the polarized light whose polarization is in the second direction are respectively called, for example, as P-polarized light and S-polarized light below. Additionally, a quarter-wave plate 50 is arranged in an optical path between the polarizing beam splitter 21 and the semi-reflector 30.

Further as shown by FIG. 2, when light L10 emitted from the image source 10 passes through the polarizing beam splitter 21, a P-polarized light component L10p of the light L10 emitted from the image source is transmitted through the splitter and a S-polarized light component L10s of the light L10 emitted from the image source is reflected toward the semi-reflector 30 or the quarter-wave plate 50. After passing through the quarter-wave plate 50, the S-polarized light component L10s is converted into circularly polarized light (or elliptically polarized light). Then, the circularly polarized light (or the elliptically polarized light) is partially reflected by the semi-reflector 30 and is partially transmitted through the same. When passing through the quarter-wave plate 50, the reflected circularly polarized light ((or the reflected elliptically polarized light)) is converted into a P-polarized light component L10p. Subsequently, this P-polarized light component L10p passes through the polarizing beam splitter 21 to be seen by the human eye 40. In the meanwhile, ambient light L30 also sequentially passes through the semi-reflector 30 and the quarter-wave plate 50 and then partially through the splitter 21 to be seen by the human eye 40. Furthermore, after being incident on the polarizing beam splitter 20, unwanted light L20 is converted into a P-polarized light component L20p being transmitted through the splitter and a S-polarized light component L20s reflected by the splitter, wherein only the S-polarized light component L20s can be seen by the human eye 40.

In the optical system shown by FIG. 1, the light energy of the light L10 emitted from the image source, after being incident on the splitter 20, loses half; then, the light energy of the light, after being incident on the semi-reflector 30, loses half; then, the light energy of the light, after being returned back and being incident on the splitter 20 again, loses half. That is to say, only one eighth of the light energy of the initial light LI 0 emitted from the image source can be used for imaging in the human eye 40. In contrast, in the optical system shown by FIG. 2, the light energy of the light L10 emitted from the image source, after being incident on the splitter 21, loses half; then, the light energy of the light, after being incident on the semi-reflector 30, loses half; however, the light energy of the light, after being returned back and being incident on the splitter 20 again, will not lose any. That is to say, a quarter of the light energy of the initial light LI 0 emitted from the image source is used for imaging in the human eye 40, which substantially improves imaging brightness and contrast and thus reduces the apparatus's power consumption. However, neither the optical system shown by FIG. 1 nor the optical system shown by FIG. 2 concerns about how to eliminate or weaken the influence of the unwanted light L20.

An optical system 1000 of an AR apparatus according to a first embodiment of the present application will be explained with respect to FIG. 3a below. The optical system 1000 comprises an image source 100, a beam splitter component 22, a quarter-wave plate 500, and a semi-reflector 300. For example, the AR apparatus can comprise a holder in which the optical system 1000 is integrated. If the AR apparatus is a head-mounted AR apparatus, the holder can be a spectacle frame. Therefore, the optical system 1000 can be integrated in the spectacle frame so as to constitute a visual imaging part of the head-mounted AR apparatus.

For instance, the image source 100 can comprise an image source and a lens subassembly. The image source is used to emit light, under control of a computer, to display an image that need be presented to the human eye 40. Optionally, the image source can be a planar or curved image source which is for example made from optics such as organic light-emitting diodes (OLED), liquid crystal on silicon (LCOS), liquid crystal diodes (LCD) or the like. The lens subassembly can comprise one or more lenses which are used to focus the light emitted from the image source so as to get clearer imaging.

Optionally, in order to improve the efficiency of light transmission, the image source 100 can also comprise a matching lens between the image source and the lens subassembly. The matching lens can be securely fitted to a light-emitting side of the image source and a lens side of the lens subassembly respectively.

The semi-reflector 300 can be a curved semi-reflector. For instance, the semi-reflector can have an optical surface which is partially spherical, partially cylindrical or hemispherical, and the center of curvature of the semi-reflector is close to the beam splitter component 22. Alternatively, according to the present application, the semi-reflector can be in the form of a partially rotational symmetric (non-spherical) shape or any suitable free curved shape. The quarter-wave plate 500 is located between the beam splitter component 22 and the semi-reflector 300. In an alternative embodiment, the quarter-wave plate 500 can be shaped to conform to a surface of the semi-reflector 300 such that it can be directly affixed on the semi-reflector 300 to constitute an integral optical device. Furthermore, it should be understood by one ordinary person in the art that the term "semi-reflector" does not mean that half the energy of light incident on it is reflected by and half the energy of the light is transmitted through the semi-reflector. Rather, the ratio between the reflected light energy and the transmitted light energy can for instance depend on the characteristics of the "semi-reflector" itself.

Figure 3A:
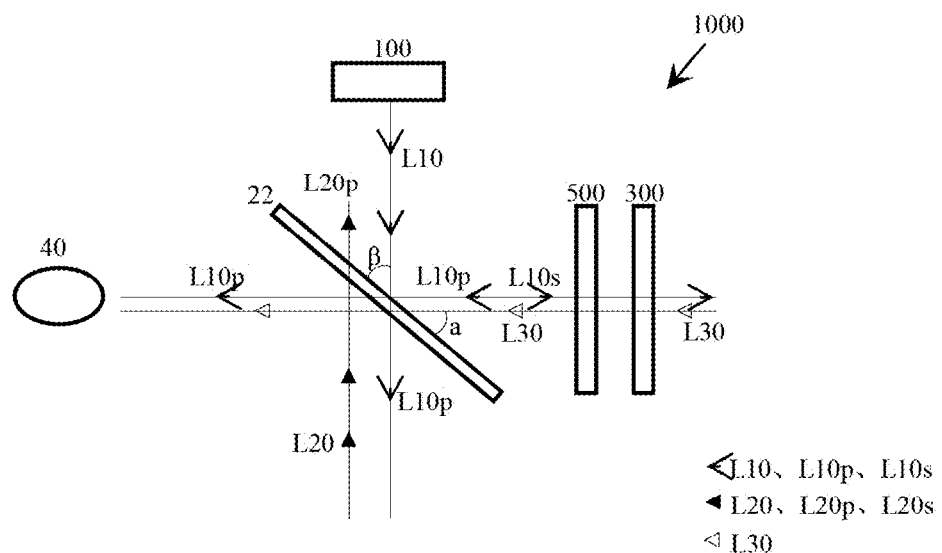
FIG. 3a is a view schematically illustrating an optical system of an AR apparatus according to a first embodiment of the present application.
Figure 3B:
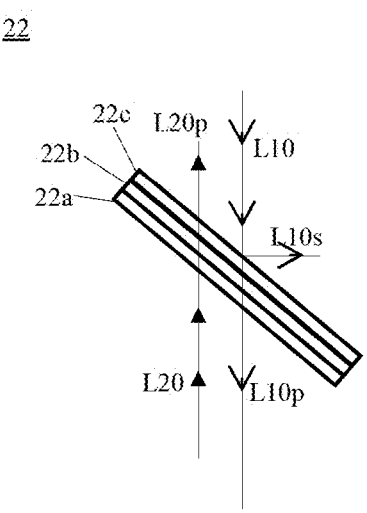

FIG. 3b is an enlarged view illustrating the beam splitter component 22 of FIG. 3a. The beam splitter component is a three-layer structure, comprising a splitter substrate 22a, a polarizing film 22b and a polarizing beam splitting film 22c in this order. The splitter substrate 22a can be a light splitter well-known in the art, for example a non-polarizing beam splitter. The polarizing film 22b is a film allowing polarized light, whose polarization is in a first direction, to pass therethrough but absorbing polarized light whose polarization is in a second direction perpendicular to the first direction. The polarizing beam splitting film 22c is a film enabling the polarized light, whose polarization is in the first direction, to be transmitted therethrough and the polarized light, whose polarization is in the second direction, to be reflected. In an embodiment, the splitter substrate's diopter is 0~800°.

For the purpose of clear description, polarized light whose polarization is in a P-direction will be assumed as the polarized light whose polarization is in the first direction and polarized light whose polarization is in a S-direction will be assumed as the polarized light whose polarization is in the second direction respectively below. However, the ordinary person in the art shall understand that the P-polarized light and the S-polarized light can be rotated about a path, along which light propagates, under the premise of ensuring that their polarizing directions are perpendicular to each other. Therefore, the light polarized in the first direction can be polarized light whose polarization is at an angle relative to the P-direction, and the light polarized in the second direction can be polarized light whose polarization is at the same angle relative to the S-direction.

In the context of the specification, the term "film" or "plate" refers to a thin-layer structure which can be attached to another thin-layer structure in the form of a "film" or "plate", or refers to a single thin-layer structure.

In the embodiment shown by FIGS. 3a and 3b, the polarizing beam splitting film 22c and the splitter substrate 22a define a beam splitting side and a transmission side of the beam splitter component 22 respectively. In the context of the specification, the beam splitting side of the beam splitter component refers to a surface or interface, defined by a constituent part of the beam splitter component, wherein light can be incident on the surface or interface and/or can be partially reflected and can be partially transmitted therethrough; and the transmission side of the beam splitter component refers to a surface or interface, defined by a constituent part of the beam splitter component, wherein light can be incident on the surface or interface and/or can be transmitted therethrough out of the beam splitter component. In the illustrated embodiment, the beam splitting side of the beam splitter component 22 is close to the image source 100 and the transmission side of the beam splitter component 22 is facing away from the image source 100.

In the context of the specification, the beam splitting side of a splitter or beam splitter component refers to a surface or interface, defined by a constituent part of the splitter or beam splitter component, wherein light can be incident on the surface or interface and/or can be partially reflected and be partially transmitted therethrough; the transmission side of a splitter or splitter assembler refers to a surface of interface, defined by a constituent part of the splitter or beam splitter component, wherein light can be incident on the surface or interface and/or can be transmitted therethrough out of the splitter. In the embodiment shown by FIG. 2, the polarizing beam splitting film of the splitter 21 defines its beam splitting side and the splitter substrate defines the transmission side of the splitter. In the splitter 20 shown by FIG. 1, a surface of the splitter 20 adjacent to the image source 10 is the beam splitting side, and a surface of the splitter 20 facing away from the image source 10 is the transmission side.

Furthermore, it should be understood that in the context of the specification, the splitter (or its splitter substrate) can be cubic or planar. For instance, in a cubic beam splitter comprised of two right angled isosceles triangle prisms, a bevel of the prism constitutes a beam-splitting side of the splitter. For instance again, in a planar splitter, a planar surface of the splitter's planar substrate constitutes a beam splitting side of the splitter.

In the optical system 1000 shown by FIG. 3a, a plane where the beam splitting side of the beam splitter component 22 locates is a plane where the polarizing beam splitting film 22c substantially locates. The image source comprises a planar image source used to emit light. In the context of the specification, the planar image source means that it has a substantially planar light-emitting side. The plane where the beam splitting side of the beam splitter component 22 locates is at an angle β relative to the normal of the image source. The angle β has a value between 11° and 79°, preferably between 20° and 70°, more preferably between 30° and 60°, more preferably between 40° and 55°, most preferably between 40° and 50°. The plane where the beam splitting side of the beam splitter component 22 locates is at an angle α relative to an optical axis of the semi-reflector 300, wherein the angle α is between β−10° and β+10° and 0<α<90°. In this way, the maximum utilization efficiency of the light energy can be achieved.

In the beam splitter component 22, the beam splitting side is separated from the transmission side by the polarizing film. The beam splitter component 22 is arranged in such a way that its beam splitting side is adjacent to the image source 100 and/or the quarter-wave plate 500, and that its transmission side is facing away from the image source 100. When the light L10 emitted from the image source 100 is incident on the polarizing beam splitting film 22c (the beam splitting side) of the beam splitter component 22, the P-polarized light component L10p of the light L10 emitted from the image source is transmitted through the polarizing beam splitting film 22c and further through the polarizing film 22b to exit outward from the transmission side of the beam splitter component 22. The S-polarized light component L10s of the light L10 emitted from the image source is reflected toward the quarter-wave plate 500. When passing through the quarter-wave plate 500, the S-polarized light component L10s is converted into circularly polarized light. When arriving in the semi-reflector 300, the circularly polarized light is partially transmitted therethrough and is partially reflected thereby. The reflected circularly polarized light passes through the quarter-wave plate 500 again and then is converted into a P-polarized light component L10p. Subsequently, the P-polarized light component L10p is incident on the polarizing beam splitting film 22c (the beam splitting side) of the beam splitter component 22, and passes through the same and the polarizing film 22b to be seen by the human eye 40. In the meanwhile, ambient light L30 passes through the semi-reflector 300 and the quarter-wave plate 500 in this order and partially through the beam splitter component 22 to be seen by the human eye 40. Furthermore, when unwanted light L20 is incident on the splitter substrate 22a (the transmission side) of the beam splitter component 22, an S-polarized light component of the unwanted light is absorbed by the polarizing film 22b and a P-polarized light component of the unwanted light passes through the polarizing film 22b and subsequently through the polarizing beam splitting film 22c. Therefore, in the optical system shown by FIG. 3a, ideally, no light component of the unwanted light L20 can transmit toward the human eye 40 such that influence of the unwanted light on the user's observation is eliminated or weakened, and thus the whole optical system's image quality is improved.

In an alternative embodiment, positions of the splitter substrate 22a and the polarizing film 22b are interchangeable. Even in an alternative embodiment, the splitter substrate 22 can be dispensed with.

In practical production, because the splitter substrate or the film itself has a thickness, not all of the light L10 emitted from the image source, upon being incident on the beam splitter component 22, can be modulated by the polarizing film 22b and the polarizing beam splitting film 22c. That is to say, there is a possibility that a very small portion of the component of the light L10 emitted from the image source may be transmitted onto the transmission side of the beam splitter component 22. Due to interface of the transmission side with air, this very small portion of the component of the light L10 emitted from the image source may be reflected toward the polarizing film 22b and the polarizing beam splitting film 22c. Finally, this very small portion of the component of the light L10 emitted from the image source may result in "interference of ghost" in imaging of the whole optical system, which thus affects the image quality that can be seen by the human eye 40.

Figure 4A:
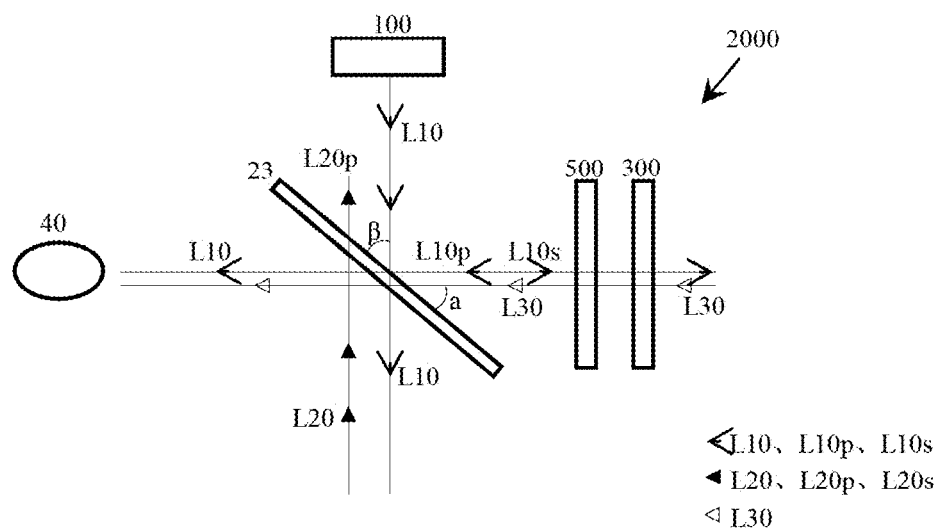
FIG. 4a is a view schematically illustrating an optical system, according to a second embodiment of the present application, of the AR apparatus.

In order to eliminate or weaken such "interference of ghost", an optical system 2000 of an AR apparatus according to a second embodiment of the present application will be explained with reference to FIGS. 4a and 4b below. The optical system 2000 comprises an image source 100, a beam splitter component 23, a quarter-wave plate 500 and a semi-reflector 300. Regarding the contents relating to the light 100 emitted from the image source, the quarter-wave plate 500 and the semi-reflector 300, please refer to the introduction to the optical system 1000. Now, only features of the optical system 2000 that are different than the optical system 1000 will be explained below.

In the optical system 2000, the beam splitter component 23 is a four-layer structure, comprising a splitter substrate 23a, a quarter-retarder film 23b, a polarizing film 23c and a polarizing beam splitting film 23d in this order. For example, they are sequentially adhered together as an integral piece. The polarizing beam splitting film 23d defines a beam splitting side of the beam splitter component 23, and the splitter substrate 23a defines a transmission side of the beam splitter component 23. In the beam splitter component 23, the beam splitting side and the transmission side are separated by the quarter-retarder film 23b and the polarizing film 23c.

In the optical system 2000 shown by FIG. 4a, when light L10 emitted from the image source 100 is incident on the polarizing beam splitting film 23d (the beam splitting side) of the beam splitter component 23, a P-polarized light component L10p of the light L10 emitted from the image source passes through the polarizing beam splitting film 23d and subsequently the polarizing film 23c, and is converted into circularly polarized light by the quarter-retarder film 23b and exits outward from the transmission side of the beam splitter component 23. An S-polarized light component L10s of the light L10 emitted from the image source is reflected toward the quarter-wave plate 500. When passing through the quarter-wave plate 500, the S-polarized light component L10s is converted into circularly polarized light which, upon arriving in the semi-reflector 300, is partially transmitted therethrough and is partially reflected thereby. The reflected circularly polarized light passes through the quarter-wave plate 500 again and thus is converted into a P-polarized light component L10p. This P-polarized light component L10p is then incident on the polarizing beam splitting film 23d (the beam splitting side) of the beam splitter component 23. When passing through the polarizing beam splitting film 23d and the polarizing film 23c, this P-polarized light component L10p is converted into circularly polarized light by the quarter-retarder film 23b, which circularly polarized light finally passes through the splitter substrate 23a to be seen by the human eye 40. In the meanwhile, ambient light L30 also passes through the semi-reflector 300 and the quarter-wave plate 500 in this order, and partially through the beam splitter component 23 to be seen by the human eye 40. Furthermore, after unwanted light L20 is incident on the splitter substrate 23a (the transmission side) of the beam splitter component 23, only a P-polarized light component L20p of the unwanted light can pass through the polarizing film 23c and further through the polarizing beam splitting film 23d.

Figure 4B:
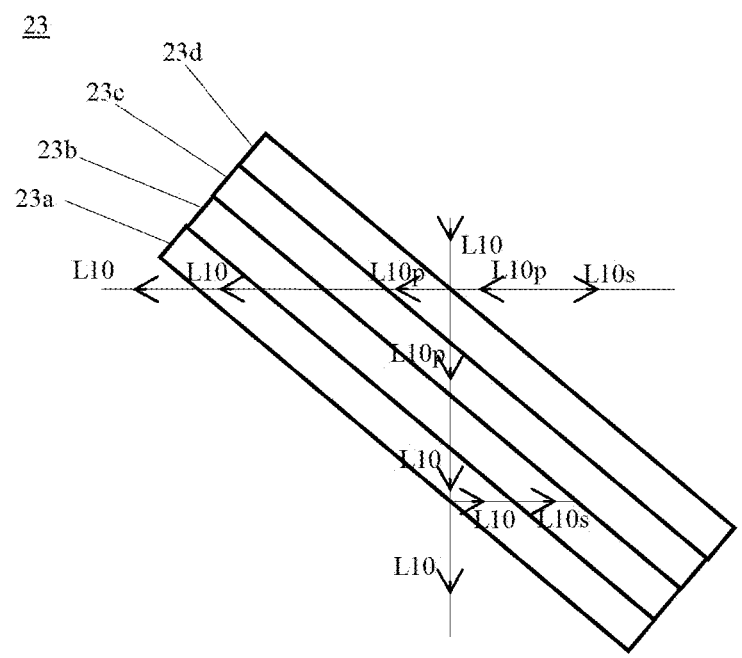

Further as shown by FIG. 4b, when the light L10 emitted from the image source 100 is incident on the polarizing beam splitting film 23d (the beam splitting side) of the beam splitter component 23, the P-polarized light component L20p of the light L10 emitted from the image source is converted by the quarter-retarder film 23b into circularly polarized light. When propagating in the splitter substrate 23a to an interface with air (the transmission side), a small portion of the circularly polarized light will be reflected at the interface toward the quarter-retarder film 23b within the splitter substrate 23a because the medium parameters of the air and the substrate are obviously different than each other at the interface. When passing through the quarter-retarder film 23b again, the reflected circularly polarized light will be converted into an S-polarized light component since its polarization direction is changed by 90°. Subsequently, the S-polarized light component is absorbed by the adjacent polarizing film 23c. Therefore, any negative effects caused by stray light and "interference of ghost" can be reduced or completely eliminated.

In the embodiment shown by FIG. 4b, from the transmission side to the beam splitting side of the beam splitter component 23, the splitter substrate 23a, the quarter-retarder film 23b, the polarizing film 23c and the polarizing beam splitting film 23d are ordered in sequence. In an alternative embodiment, from the transmission side to the beam splitting side of the beam splitter component 23, they can be re-arranged in such a way that the quarter-retarder film, the splitter substrate, the polarizing film and the polarizing beam splitting film are ordered in sequence. In another alternative embodiment, from the transmission side to the beam splitting side of the beam splitter component 23, they can be re-arranged in such a way that the quarter-retarder film, the polarizing film, the splitter substrate and the polarizing beam splitting film are ordered in sequence. In another alternative embodiment, from the transmission side to the beam splitting side of the beam splitter component 23, they can be re-arranged in such a way that the quarter-retarder film, the polarizing film, the polarizing beam splitting film and the splitter substrate are ordered in sequence. In another alternative embodiment, even the splitter substrate can be dispensed with.

It should be understood by the ordinary person in the art, after reading the description of the present application, that although the quarter-wave plate or film has been described here, the plate or film can be replaced in the present application by any other wave plate or retarder film or optical element, which can enable an additional optical path difference to be generated between two lights polarized perpendicular to each other, as long as the other wave plate or retarder film or optical element can achieve or substantially achieve similar functions as in those already mentioned technical solutions of the present application.

Figure 5:
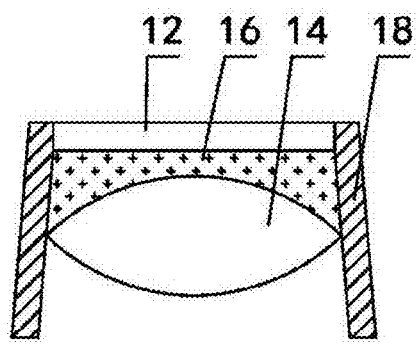
FIG. 5 is a cross-sectional view schematically illustrating an image source of the AR apparatus according to an embodiment of the present application.
Figure 6:
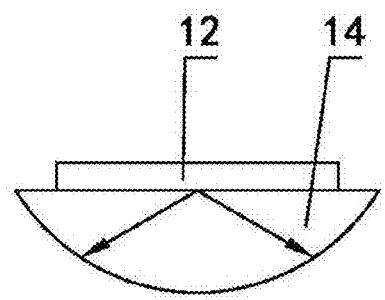
FIG. 6 is a cross-sectional view schematically illustrating an image source of the AR apparatus according to another embodiment of the present application.

The image source can be embodied in different forms. FIGS. 5 and 6 schematically illustrate two different embodiments of the image source.

The image source generally comprises an image source and a beam shaping element.

According to the present application, the image source of the image source can be any suitable kind of image source. In some embodiments, the image source can be a monochromatic or polychromatic light source. In some embodiments, the image source can be a laser light source or a light-emitting diode (LED) light source, for example a LED display screen. In some embodiments, the image source can be a planar image source such as a planar display screen or alternatively a curved image source such as a curved display screen. In some embodiments, the image source can be an integrated image source or a single image source. Examples of the image source can comprise, but is not limited to, organic light-emitting diodes (OLED); liquid crystal on silicon (LCOS), liquid crystal diodes (LCD), MEMS based Displays or Digital Micro-mirror Devices (DMD).

The beam shaping element of the image source is disposed in an optical path of light emitted from the image source, so as to collimate, shape and/or combine light beams emitting form the image source.

According to the present application, the beam shaping element can be configured as a lens. The lens for forming the beam shaping element according to the present application can be one lens or a lens subassembly comprised offenses. The lens or each lens of the lens subassembly can be a positive lens, a negative lens or any combination of them or the like. The lens can have a spherical surface, aspherical surface or freeform surface or the like.

According to the present application's principle, the beam shaping element can be directly integrated into the image source in a manner of face-fitting through adhesion or the like, or integrated into the image source via an intermediate matching part. In other words, the image source and the beam shaping element of the image source of the AR apparatus according to the present application can be directly integrated or indirectly integrated by the intermediate matching part, as a monolithic piece. The intermediate matching part is formed by such a matching medium which is not air and whose refractive index is greater than 1. In this way, light beams VL emitted from the image source and carrying virtual image information can enter the beam shaping element directly or through the matching medium whose refractive index is greater than 1. Thereafter, they shoot out of the image source through the beam shaping element.

Optionally, the refractive index of the matching medium for forming the intermediate matching part can be 1~2.7. The matching medium for forming the intermediate matching part can be a liquid medium, a liquid crystal medium, a semi-solid medium or a solid medium. The intermediate matching part can be formed by at least one of the mentioned mediums. The liquid medium can be a transparent medium such as water or ethyl alcohol. The solid medium can be a transparent solid medium such as glass or resin.

FIG. 5 illustrates an example of the image source of the AR apparatus according to the present application. In this example, an image source 12 and a beam shaping element 14 are indirectly integrated together by an intermediate matching part 16. In this example, the beam shaping element 14 is provided as a lens, and the intermediate matching part 16 is formed by a liquid and/or liquid medium. Consequently, the image source 10 comprises a seal structure by which the liquid or liquid medium can be sealed between the image source 12 and the beam shaping element 14. It is understood that the seal structure can be any suitable seal structure known in the art.

In a possible embodiment, the seal structure comprises a seal frame 18. The seal frame 18 is adhered to the image source 12 to achieve seal therebetween. Seal between the seal frame 18 and the lens of the beam shaping element 14 can be achieved by inlay engagement therebetween. Optionally, depending on which kind of medium is used to form the intermediate matching part 16, the seal frame 18 can be adhered to the lens of the beam shaping element 14.

According to such configuration, light beams emitted from the image source 12 and carrying virtual image can enter first the intermediate matching part 16 and then the beam shaping element 14 which is in the form of a lens. As the refractive index of the matching medium is greater than that of air, the refractive index's difference between the medium, by which the lens of the beam shaping element 14 is formed, and the matching medium is less than the refractive index's difference between the medium, by which the lens of the beam shaping element 14 is formed, and air at an interface between the intermediate matching part 16 and the beam shaping element 14. Therefore, much more light beams can be refracted such that light transmittance can be improved and the image source's optical efficiency can be increased. Consequently, less light beams can be reflected at the interface such that occurring of stray light and ghost image can be restrained or reduced.

It is observed from an equation $R=(0.61*\lambda)/(n*\sin\theta)$, wherein R is the radius of an Airy disc, $\lambda$ is the wavelength of the light, n is the refractive index in image space and θ is the incidence aperture angle, that as the refractive index of the matching medium becomes greater, the produced Airy disc will become smaller and thus the imaging resolution can be increased. Furthermore, because the refractive index becomes greater at the imaging side, a great numerical aperture can be obtained with a relatively smaller aperture angle and the bending angle of marginal light beams can be reduced, which results in less design difficulty. Moreover, since the image source is integrated together with the beam shaping element, the optical structure is more compact and more easily installed and adjusted, and thus is more systemic.

FIG. 6 illustrates another example of the image source of the AR apparatus according to the present application. In this example; an image source 12 and a beam shaping element 14 are integrated together in a manner of face-fitting. The image source 12 and the beam shaping element 14 have complementary contact sides which can be fitted onto each other. As one example, a lens, by which the beam shaping element 14 is formed, is adhered to the image source 12. Alternatively, the image source 12 and the beam shaping element 14 can be fitted onto each other via any other suitable manner known by the ordinary person in the art.

According to such configuration, source light beams emitted from the image source 12 directly enters the lens forming the beam shaping element 14. Such configuration can provide all benefits as those described with respect to FIG. 5. Additionally, in such configuration, the image source is directly fitted onto the lens such that the optical structure can be more compact, smaller, lighter and is more comfortable to be worn. The more compact structure ensures that it is easy to be installed and adjusted.

Some possible examples of the image source according to the present application have been explained with respect to FIGS. 5 and 6. It should be understood by the ordinary person in the art that those are not all of examples of the image source according to the present application. According to the present application, such an embodiment, in which the image source is integrated together with the beam shaping element, is also feasible. It should be understood by the ordinary person in the art that according to the present application the image source can be used in combination with a light path module no matter how the module is comprised of and no matter what kind of function the module has. The light path module used in combination with the image source according to the present application can comprise any number of optical elements having any functions or a combination of optical elements arbitrarily arranged.

According to an optional embodiment of the present application, the image source comprises an image source and a beam shaping element integrated with each other as a unitary piece, in which light beams emitted from the image source are shaped by the beam shaping element to exit out of the image source. Optionally, the beam shaping element is directly integrated into the image source. For instance, the beam shaping element is adhered to the image source in a manner of face-fitting. Optionally, the beam shaping element can be indirectly integrated into the image source via an intermediate matching part. Optionally, the intermediate matching part is formed by at least one selected from a group comprised of a liquid medium, a liquid crystal medium, a semi-solid medium and a solid medium.

Optionally, the intermediate matching part is formed by any one selected from a group comprised of water, ethyl alcohol, glass and resin.

Optionally, the intermediate matching part is formed by a liquid medium and/or a liquid crystal medium, and the image source comprises a seal structure by which the medium forming the intermediate matching part is sealed between the image source and the beam shaping element.

Optionally, the medium of the intermediate matching part has a refractive index of 1~2.7.

Optionally, the beam shaping element is configured as a positive lens or configured as a negative lens or configured as a combination of positive and negative lenses.

Figure 7:
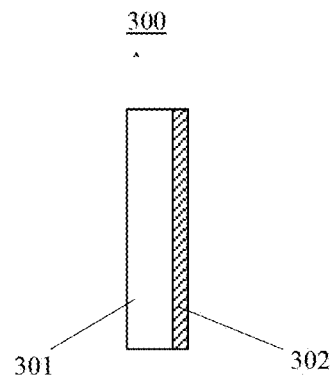
FIG. 7 is a cross-sectional view schematically illustrating a semi-reflector according to an embodiment of the present application.

FIG. 7 is a cross-sectional view schematically illustrating an embodiment of the semi-reflector 300A according to an embodiment of the present application. This semi-reflector 300A can be alternatively used in those optical systems according to the present application, and comprises a transparent substrate 301 and a semi-reflective film 302 covering on a distal surface of the transparent substrate 301. In an embodiment, the substrate 301 has a diopter of 0~800°.

For a conventional semi-reflector, a semi-reflective film is usually located on a proximal surface of a substrate. If such a conventional semi-reflector were used in the illustrated optical system, light emitted from the image source entering the human eye 40 or its light component mainly occurs with one reflection. However, for the semi-reflector 300A shown by FIG. 7, the light emitted from the image source entering the human eye 40 or its light component at least occurs with two refractions and one reflection. Therefore, using the inventive technical means, the whole optical system's design freedom can be increased. For instance, designers can redesign the refraction property of light by changing the thickness of the substrate 301 or its material characteristics and changing the proximal surface morphology of the substrate 301 such that the whole optical system's optical performance can be modified. Furthermore, because propagation of light in the substrate 301 relates to reflection and refraction, light at the final refraction will result in an effect of field-of-view enlargement, which facilitates final imaging results in the human eye.

Figure 8:
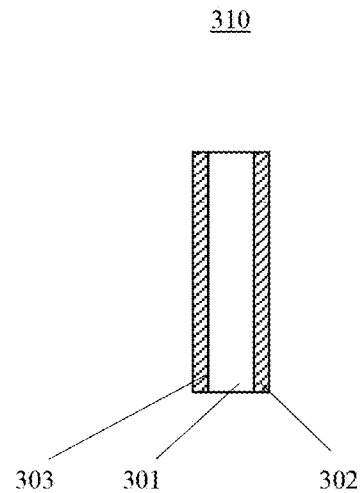
FIG. 8 is a cross-sectional view schematically illustrating a semi-reflector according to another embodiment of the present application.

FIG. 8 schematically illustrates a semi-reflector 301 according to another embodiment of the present application. Similar to the semi-reflector 300A, the semi-reflector 300 comprises a transparent substrate 301 and a semi-reflective film 302 covering on a distal surface of the transparent substrate 301. Additionally, the semi-reflector 310 also comprises an anti-reflective film 303 covering on a proximal surface of the transparent substrate 301. The anti-reflective film 303 is used to increase the energy of light entering the substrate so as to improve the energy utilization efficiency of light which is modulated via refraction and reflection. In an embodiment, the substrate 301 has a diopter of 0~800°.

Figure 9:
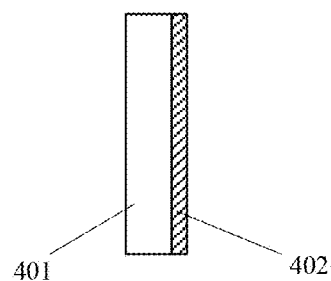
FIG. 9 is a cross-sectional view schematically illustrating a semi-reflector according to another embodiment of the present application.

FIG. 9 schematically illustrates a semi-reflector 400 according to another embodiment of the present application. The semi-reflector 400 comprises a quarter-wave plate 401 and a semi-reflective film 402 covering on a distal surface of the quarter-wave plate 401. That is, in this embodiment, the quarter-wave plate 401 is a substrate of the semi-reflector 400.

According to an optional embodiment, an optical system for an augmented reality (AR) apparatus is provided, which optical system comprises:

an image source;

a splitter, the splitter having a beam splitting side adjacent to the image source and a transmission side facing away from the image source; and a semi-reflector, the semi-reflector being arranged adjacent to the beam splitting side and located downstream of the beam splitting side in an optical path along which light emitted from the image source is reflected by the beam splitting side, the splitter being arranged in such a way that the light emitted from the image source is able to be at least partially reflected by the beam splitting side toward the semi-reflector, wherein the semi-reflector comprises a substrate and a semi-reflective film located on a distal surface of the substrate.

Because the semi-reflective film is located on the distal surface of the substrate of the semi-reflector, the light emitted from the image source, prior to entry into a human eye for imaging therein, can occur at the semi-reflector with two refractions and one reflection such that the whole optical system's design freedom can be increased. Therefore, more parameters which can be adjusted are provided to improve the image quality of the whole optical system. In the meanwhile, it can result in enlargement of field-of-view and facilitates better imaging results in the human eye.

Optionally, a wave plate is arranged between the splitter and the semi-reflector. Preferably, the wave plate is a quarter-wave plate. Use of the wave plate or the quarter-wave plate can improve the imaging's brightness and contrast, and thus reduce the apparatus's power consumption.

Optionally, the substrate of the semi-reflector is a wave plate. Preferably, the wave plate is a quarter-wave plate. Integration of the wave plate or the quarter-wave plate in the semi-reflector reduces the volume of the semi-reflector, such that the flexibility of mechanical structural design for the whole optical system can be improved. Moreover, the integration can reduce the number of reflective interfaces, such that stray light occurring in the whole optical system can be reduced or the effect of "interference of ghost" can be weakened, so as to increase the optical system's contrast.

Optionally, an anti-reflective film covers on a proximal surface of the substrate. The anti-reflective film is used to increase the energy of light entering the substrate so as to improve the energy utilization efficiency of light which is modulated via refraction and reflection.

Optionally, the splitter is configured in such a way that when the light emitted from the image source is incident on the beam splitting side, a polarized light component, whose polarization is in a first direction, passes through the splitter to be transmitted through the transmission side, and a polarized light component, whose polarization is in a second direction perpendicular to the first direction, is reflected by the beam splitting side toward the wave plate; and the splitter is also configured in such a way that when light is incident on the transmission side, a polarized light component, whose polarization is in the first direction, of the light is able to pass through the splitter to be transmitted from the beam splitting side, and a polarized light component, whose polarization is in the second direction, of the light is able to be absorbed in the splitter. In this way, except for ambient light, unwanted light entering the human eye can be blocked or reduced, such that the image quality and sharpness can be improved and the power consumption of the AR apparatus can be saved.

Optionally, the splitter comprises a polarizing beam splitting film and a polarizing film, wherein the polarizing beam splitting film is configured in such a way that light polarized in the first direction is allowed to pass therethrough and light polarized in the second direction is reflected thereby, wherein the polarizing film is configured in such a way that light polarized in the first direction is allowed to pass therethrough and light polarized in the second direction is absorbed therein, and wherein viewed in a direction of the light emitted from the image source, the polarizing beam splitting film is upstream of the polarizing film to define the beam splitting side. In this way, the polarized light component whose polarization is in the second direction is ensured to be inevitably reflected by the polarizing beam splitting film so as to subsequently be processed by the wave plate or quarter-wave plate and the semi-reflector and then enter the human eye for imaging. Optionally, an extraordinary axis and an ordinary axis of the wave plate are configured to include an angle with the first and second directions respectively, which angle is between 1° and 89°, preferably between 30° and 60°, more preferably is 45°.

Optionally, the image source comprises a planar image source for emitting light, wherein a plane where the beam splitting side of the splitter locates is at a first angle relative to the normal of the lighter emitter, which first angle has a value between 11° and 79°, preferably between 20° and 70°, more preferably between 30° and 60°, more preferably between 40° and 55°, most preferably between 40° and 50°; and/or the plane where the beam splitting side of the splitter locates is at a second angle relative to the optical axis of the semi-reflector, wherein 0<the second angle<90° and the second angle is between the first angle −10° and the first angle +10°. In this way, the utilization efficiency of the splitter can be maximized. In the context of the present application, the tem "between" relating to a range of value means that both end values of the range shall be considered as well. For instance, "a value A is between a value B and a value C" means that the value A can be the value B, the value C or a value which is greater than the value A but less than the value C.

Optionally, the semi-reflector is a curved semi-reflector.

Optionally, the curved semi-reflector's diopter is between ±150 degrees, preferably ±100 degrees. In this way, it can be ensured that comfort for a user is unaffected when the apparatus is equipped by him/her to watch the scene.

According to another optional embodiment of the present application, a semi-reflector for the previously mentioned optical system is provided, wherein the semi-reflector comprises a substrate and a semi-reflective film on a distal surface of the substrate. In this way, the whole optical system's design freedom can be increased such that more parameters that can be adjusted are provided to improve the image quality of the whole optical system. In the meanwhile, this can result in field-of-view enlargement and facilitate final imaging results in the human eye. In a preferred embodiment, the substrate of the semi-reflector itself is an optical lens for refractive correction, for instance an optical lens used for correcting refractive errors.

Optionally, the substrate of the semi-reflector is a wave plate, wherein the wave plate is preferably a quarter-wave plate, such that the brightness and contrast of imaging can be improved and thus the power consumption of the apparatus can be saved.

Optionally, an anti-reflective film covers on a proximal surface of the substrate to increase the energy of light entering the substrate so as to improve the energy utilization efficiency of light which is modulated via refraction and reflection.

Optionally, the semi-reflector is a curved semi-reflector.

Optionally, the curved semi-reflector's diopter is between ±150 degrees, preferably ±100 degrees.

Figure 10:
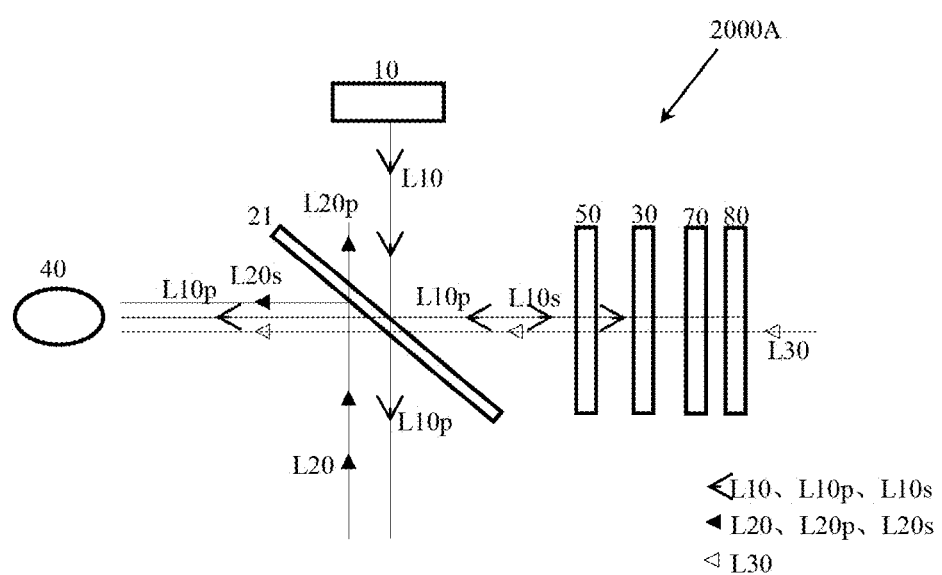
FIG. 10 schematically illustrates an optical system 2000A of the AR apparatus according to another embodiment of the present application.

FIG. 10 schematically illustrates an optical system 2000A of the AR apparatus according to another embodiment of the present application. The optical system 2000A generally comprises an image source 10 controllable by a computer (not shown), a polarizing beam splitter 21 and a semi-reflector 30, wherein a quarter-wave plate 50 is arranged in an optical path between the polarizing beam splitter 21 and the semi-reflector 30. Designs of the image source 10, the polarizing beam splitter 21, the semi-reflector 30 and the quarter-wave plate 50 can refer to the already-mentioned contents. Additionally, in an optical path along which light emitted from the image source 10 is reflected by a beam splitting side of the splitter, a secondary quarter-wave plate 70 and a polarizer 80 are sequentially arranged distal to the semi-reflector 30 of the optical system 2000A, wherein the polarizer 80 is located distal to the secondary quarter-wave plate 70. The quarter-wave plate 70 is configured in such a way that circularly polarized light can be converted into linearly-polarized light whose polarization is in a first or second direction, and the polarizer 80 is configured to absorb said linearly-polarized light. For example, the quarter-wave plate 70 can be configured to convert circularly polarized light into S-polarized light, and the polarizer 80 can be configured to enable P-polarized light to pass therethrough and to absorb S-polarized light. For example again, the quarter-wave plate 70 can be configured to convert circularly polarized light into P-polarized light, and the polarizer 80 can be configured to enable S-polarized light to pass therethrough and to absorb P-polarized light. An extraordinary axis or an ordinary axis of the quarter-wave plate 70 is configured such that the axis can be at an angle relative to the polarization direction of polarized light passing through the polarizer 80, which angle is between 30 and 60 degrees. Optionally, the extraordinary axis or the ordinary axis of the quarter-wave plate 70 is configured such that the axis is at an angle of 45 degrees relative to the polarization direction of polarized light passing through the polarizer 80.

As shown by FIG. 10, when the light L10 emitted from the image source 10 passes through the polarizing beam splitter 21, the P-polarized light component L10$p$ of the light L10 emitted from the image source is transmitted therethrough, and the S-polarized light component L10$s$ of the light L10 emitted from the image source is reflected toward the semi-reflector 30 or the quarter-wave plate 50. When passing through the quarter-wave plate 50, the S-polarized light component L10$s$ is converted into circularly polarized light (or elliptically polarized light). Subsequently, the circularly polarized light (or the elliptically polarized light) will be partially reflected by the semi-reflector 30 and be partially transmitted therethrough. In case of circularly polarized light, the transmitted circularly polarized light, upon passing through the quarter-wave plate 70, can be converted into S-polarized light (or P-polarized light) which is then incident on the polarizer 80, which is configured to absorb the S-polarized light (or the P-polarized light) and enable the P-polarized light (or the S-polarized light) to be transmitted therethrough, and is absorbed by the polarizer 80. In this way, no or less light L10 emitted from the image source can exit out of the AR apparatus. In case of elliptically polarized light, most of the transmitted elliptically polarized light will be absorbed so as to be prevented from escaping out of the AR apparatus. The privacy for the AR apparatus and the interactivity for users can be improved.

In an optional embodiment, the wave plate 70 is adhered to the polarizer 80 so as to reduce the number of interfaces at which light passing through them may be transmitted or reflected. In this way, the utilization efficiency of light can be increased.

In the case that the semi-reflector 30 is a curved semi-reflector, shapes of the wave plate 70 and the polarizer 80 in a lateral direction follows the semi-reflector's curved shape. In the context of the present application, the lateral direction generally refers to the coronal direction of a user of the AR apparatus. Therefore, any negative effects of stray light and "ghost" effects can be reduced and the image quality can be enhanced. Optionally, an additional wave plate and an additional polarizer are shaped in a longitudinal direction generally perpendicular to the coronal direction to follow the semi-reflector's curved shape. Optionally, the semi-reflector is a curved semi-reflector such that the additional wave plate and polarizer are shaped to substantially follow the semi-reflector's curved shape to achieve an optimal effect that any negative effects of stray light and "interference of ghost" can be reduced.

In an optional embodiment, the optical system also comprises a transparent protection sheet located distal to the additional polarizer. The wave plate 70 and the polarizer 80 are located between the semi-reflector 30 and the transparent protection sheet so that a negative effect of "ghost" caused by that ambient light enters the transparent protection sheet and then is reflected at a distal surface of the semi-reflector 30 can be reduced. Furthermore, if light leaks out from the polarizer 80 due to the optical element's performance, a negative effect of "ghost" caused by reflection of the leaking light at the transparent protection sheet can also be reduced. The transparent protection sheet can be a light energy attenuation sheet, a photochromic sheet or an electrochromic sheet.

Figure 11:
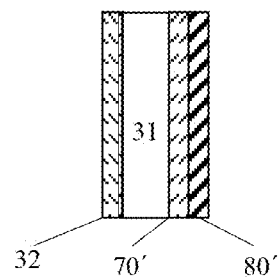
FIG. 11 is a cross-sectional view schematically illustrating a semi-reflector according to an embodiment of the present application.

FIG. 11 is a cross-sectional view schematically illustrating a semi-reflector 30' according to an embodiment of the present application. The semi-reflector 30' comprises a transparent substrate 31 and a semi-reflective film 32 covering on a proximal surface of the transparent substrate 31. Furthermore, the semi-reflector 30' also comprises a quarter-retarder film 70' and a polarizing film 80' which cover on a distal surface of the substrate 31 in this order. The quarter-retarder film 70' and the polarizing film 80' are configured in the same manner as the quarter-wave plate 70 and the polarizer 80 respectively. Therefore, because the semi-reflector 30' itself is integrated with the quarter-retarder film 70' and the polarizing film 80', the volume of the optical system can be further reduced. In the meanwhile, the number of reflective interfaces can be reduced so as to eliminate stray light appearing in the whole optical system and thus to increase the contrast of the optical system.

Figure 12:
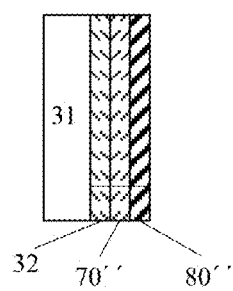
FIG. 12 is a cross-sectional view schematically illustrating a semi-reflector according to another embodiment of the present application.

Optionally, FIG. 12 is a cross-sectional view schematically illustrating a semi-reflector 30" according to another embodiment of the present application. The semi-reflector 30" comprises a transparent substrate 31 and a semi-reflective film 32 covering on a distal surface of the transparent substrate 31. Furthermore, the semi-reflector 30" also comprises a quarter-retarder film 70" and a polarizing film 80" which cover on the semi-reflector 32 in this order. The quarter-retarder film 70" and the polarizing film 80" are configured in the same manner as the quarter-wave plate 70 and the polarizer 80 respectively.

In the case that the semi-reflector 30' or the semi-reflector 30" is alternatively used in the already-mentioned optical system (FIG. 2), the S-polarized light component L10$s$, after being reflected at the beam splitting side of the splitter, is converted into circularly polarized light by the quarter-wave plate 50. When this circularly polarized light is incident on the semi-reflector 30' or 30", a light component of the circularly polarized light transmitted through the semi-reflective film 32 or light components of the circularly polarized light other than that directly reflected at the semi-reflective film 32 is converted into linearly-polarized light, which is subsequently absorbed according to the principle illustrated in FIG. 10. Therefore, the light emitted from the image source 10 is prevented from escaping out of the AR apparatus. In this way, the privacy for the AR apparatus and the interactivity for users can be improved.

In an alternative embodiment, the substrate 31 of the semi-reflector 31' can be formed in the form of the quarter-wave plate 70. Therefore, the quarter-retarder film 70' can be dispensed with.

According to an optional embodiment of the present application, an optical system for an AR apparatus is provided, which optical system comprises:

an image source; and a polarizing beam splitter, wherein the polarizing beam splitter includes a beam splitting side adjacent to the image source and a transmission side facing away from the image source, wherein the polarizing beam splitter is arranged in such a way that light emitted from the image source is able to be non-perpendicularly incident on the beam splitting side and be at least partially reflected, wherein the polarizing beam splitter is configured such that when light is incident on the beam splitting side, a polarized light component, whose polarization is in a first direction, passes through the polarizing beam splitter to be transmitted through the transmission side and a polarized light component, whose polarization is in a second direction perpendicular to the first direction, is reflected by the beam splitting side, wherein the optical system also comprises a polarizer disposed between the image source and the beam splitting side of the polarizing beam splitter, and wherein the polarizer is configured in such a way that light polarized in the second direction is able to be transmitted therethrough and light polarized in the first direction is able to be absorbed.

Providing of the polarizer decreases or eliminates the possibility that the light emitted from the image source can be seen by a human eye of the user without being reflected by the polarizing beam splitter, such that the comfort of a user who uses the apparatus can be enhanced.

Optionally, the polarizer is integrated within the image source such that light polarized in the second direction can emit from the image source. In this way, the volume of the optical system can be reduced to enable the apparatus to be more compact. Furthermore, the number of reflective interfaces can be reduced such that stray light in the whole optical system can be reduced or "ghost" effects can be weakened, and thus the contrast of the optical system can be enhanced.

Optionally, the optical system also comprises a wave plate which is adjacent to the beam splitting side, wherein the light emitted from the image source is able to be partially reflected by the beam splitting side toward the wave plate; and the optical system also comprises a semi-reflector located downstream of the wave plate in an optical path of the reflected light, wherein the wave plate is preferably a quarter-wave plate. In this way, the light energy utilization efficiency of the optical system can be improved and thus the power consumption of the AR apparatus can be saved.

Optionally, the wave plate is a retarder film covering on a proximal surface of the semi-reflector. Therefore, the volume of the optical system can be reduced so as to enable the apparatus to be more compact. Furthermore, the number of reflective interfaces can be reduced, such that stray light in the whole optical system can be reduced or "ghost" effects can be weakened, and thus the contrast of the optical system can be enhanced.

Optionally, the polarizer is arranged in such a way that the optical path of the reflected light cannot be affected and thus the final imaging quality results in the human eye will not be affected.

Optionally, the image source comprises an image source which can be controlled to emit light and a lens for focusing the emitting light, wherein the polarizer is located between the image source and the lens.

Optionally, the image source, the polarizer and the lens are adhered together; or alternatively the polarizer is adhered on one of the image source and the lens. Adhering together can reduce the number of reflective interfaces between optical elements, such that light energy loss can be reduced and thus the effect of stray light can be eliminated or weakened and the image quality can be enhanced.

Optionally, the polarizer is a polarizing film.

Optionally, the image source comprises an image source which can be controlled to emit light and a lens for focusing the emitting light, wherein the lens is located between the image source and the polarizer.

Optionally, the polarizer is a polarizing film covering on a surface of the lens.

Optionally, the image source also comprises a matching lens located between the image source and the lens, wherein the polarizer is located between the image source and the matching lens or between the matching lens and the lens.

Optionally, the image source, the matching lens, the polarizer and the lens are adhered together; or alternatively the polarizer is adhered onto one of the image source, the matching lens and the lens.

Optionally, the polarizer is a polarizing film.

Optionally, the image source also comprises a matching lens between the image source and the lens.

Optionally, the optical system also comprises an additional wave plate and an additional polarizer which are sequentially located distal to the semi-reflector, wherein the additional wave plate is configured in such a way that when circularly polarized light is incident on the additional wave plate, linearly-polarized light is able to come out of it, and the additional polarizer is configured to absorb the coming out linearly-polarized light, wherein the additional wave plate is preferably an additional quarter-wave plate. In this way, a possibility that the light emitted from the image source shoots out from the semi-reflector of the AR apparatus is eliminated or reduced, such that the privacy for the AR apparatus and the interactivity for users can be improved.

Optionally, the additional wave plate and the additional polarizer are adhered together.

Optionally, the semi-reflector is a curved semi-reflector, wherein the additional wave plate and the additional polarizer are shaped in a lateral direction to substantially follow the semi-reflector's curved shape.

Optionally, the semi-reflector is a curved semi-reflector, wherein the additional wave plate and the additional polarizer are shaped in a longitudinal direction substantially perpendicular to the lateral direction to substantially follow the semi-reflector's curved shape.

Optionally, the semi-reflector is a curved semi-reflector, wherein the additional wave plate and the additional polarizer are shaped to substantially follow the semi-reflector's curved shape.

Optionally, the optical system also comprises a transparent protection sheet located distal to the additional polarizer, wherein the transparent protection sheet is preferably a light energy attenuation sheet, a photochromic sheet or an electrochromic sheet. In this case, the additional wave plate and the additional polarizer are designed to eliminate or weaken negative effects of "interference of ghost" and stray light caused by that light shooting out of the semi-reflector and being reflected by the transparent protection sheet to finally enter the human eye.

Optionally, the additional wave plate is configured in such a way that when circularly polarized light is incident on it, a polarized light component, whose polarization is in a first direction, can be transmitted therethrough, and the additional polarizer is configured in such a way that the polarized light component, whose polarization is in the first direction, can be absorbed.

Optionally, the additional wave plate is configured in such a way that when circularly polarized light is incident on it, a polarized light component, whose polarization is in a second direction, can be transmitted therethrough, and the additional polarizer is configured in such a way that the polarized light component, whose polarization is in the second direction, can be absorbed.

Optionally, the semi-reflector comprises a transparent substrate and a semi-reflective film covering on a surface of the substrate.

Optionally, the additional wave plate and/or the additional polarizer is an additional retarder film and/or an additional polarizing film integrated on the semi-reflector, wherein the additional retarder film is preferably a quarter-retarder film. Therefore, the volume of the optical system is reduced so as to enable the AR apparatus to be more compact. Furthermore, the number of interferes where light reflection may occur can be reduced such that stray light in the whole optical system can be reduced or "ghost" effects can be weaken and the contrast of the optical system can be enhanced.

Optionally, the surface of the substrate is a proximal surface thereof, and the additional retarder film covers on a distal surface of the substrate, and/or the additional polarizing film covers on a distal surface of the additional retarder film.

Optionally, the surface of the substrate is the distal surface thereof, and the additional retarder film covers on the distal surface of the substrate, and/or the additional polarizing film covers on the distal surface of the additional retarder film.

According to another optional embodiment of the present application, an optical system for an AR apparatus is provided, which optical system comprises:
an image source;
a polarizing beam splitter, wherein the polarizing beam splitter includes a beam splitting side adjacent to the image source and a transmission side facing away from the image source;
a first wave plate adjacent to the beam splitting side, wherein the polarizing beam splitter is arranged in such a way that light emitted from the image source is able to be nonperpendicularly incident on the beam splitting side and be at least partially reflected toward the first wave plate; and
a semi-reflector located downstream of the first wave plate in an optical path of the reflected light, wherein the polarizing beam splitter is configured in such a way that when the light emitted from the image source is incident on the beam splitting side, a polarized light component, whose polarization is in a first direction, passes through the polarizing beam splitter to be transmitted through the transmission side, and a polarized light component, whose polarization is in a second direction perpendicular to the first direction, is reflected by the beam splitting side toward the first wave plate,
wherein the optical system also comprises:
a second wave plate and a polarizer which are sequentially located distal to the semi-reflector, wherein the second wave plate is arranged in such a way that when circularly polarized light is incident thereon, linearly-polarized light is able to be transmitted therefrom, and the polarizer is configured to absorb the transmitted linearly-polarized light, and wherein the first wave plate and/or the second wave plate is preferably a quarter-wave plate. In this way, a possibility that the light emitted from the image source may exit from the semi-reflector of the AR apparatus is eliminated or reduced, so that the privacy and interactivity for users can be improved.

Optionally, the second wave plate is adhered together with the polarizer.

Optionally, the semi-reflector is a curved semi-reflector, wherein the second wave plate and the polarizer are shaped in a lateral direction to follow the semi-reflector's curved shape.

Optionally, the semi-reflector is a curved semi-reflector, wherein the second wave plate and the polarizer are shaped in a longitudinal direction substantially perpendicular to the lateral direction to substantially follow the semi-reflector's curved shape.

Optionally, the semi-reflector is a curved semi-reflector, wherein the additional wave plate and the additional polarizer are shaped to substantially follow the semi-reflector's curved shape.

Optionally, the optical system also comprises a transparent protection sheet located distal to the polarizer, wherein the transparent protection sheet is preferably a light energy attenuation sheet, a photochromic sheet or an electrochromic sheet. In this case, the additional wave plate and the additional polarizer are designed to eliminate or weaken negative effects of "interference of ghost" and stray light caused by that light shooting out of the semi-reflector and being reflected by the transparent protection sheet to finally enter the human eye.

Optionally, the first wave plate is a first retarder film covering on the semi-reflector's proximal surface.

Optionally, the second wave plate is configured in such a way that when circularly polarized light is incident on it, light polarized in the first direction is able to be transmitted therethrough, and the polarizer is configured to absorb the light polarized in the first direction.

Optionally, the second wave plate is configured in such a way that when circularly polarized light is incident on it, light polarized in the second direction is able to be transmitted therethrough, and the polarizer is configured to absorb the light polarized in the second direction.

Optionally, the semi-reflector comprises a transparent substrate and a semi-reflective film covering on a surface of the substrate.

Optionally, the second wave plate and/or the polarizer is a second retarder film and/or a polarizing film integrated on the semi-reflector.

Optionally, the surface of the substrate is a proximal surface thereof, wherein the second retarder film covers on a distal surface of the substrate and/or the polarizing film covers on a distal surface of the second retarder film.

Optionally, the surface of the substrate is a distal surface thereof, wherein the second retarder film covers on the semi-reflective film's distal surface and/or the polarizing film covers on a distal surface of the second retarder film.

In the context of the present application, various embodiments can be arbitrarily combined with each other. Although some concrete embodiments of the present application have been described here, they are given for explanatory purposes only and cannot be deemed to constrain the scope of the present application in any way. Without facing away from the spirit and scope of the present application, various replacements, modifications and alternations can be contemplated.

The invention claimed is:

1. An optical system for an augmented reality apparatus, comprising:
an image source;
a polarizing beam splitter, wherein the polarizing beam splitter comprises a beam splitting side adjacent to the image source and a transmission side facing away from the image source, wherein the polarizing beam splitter is arranged in such a way that light emitted from the image source is allowed to be non-perpendicularly incident on the beam splitting side and be at least partially reflected, wherein the polarizing beam splitter is configured such that when light is incident on the beam splitting side, a polarized light component, having polarization in a first direction, passes through the polarizing beam splitter to be transmitted through the transmission side and a polarized light component, having polarization in a second direction perpendicular to the first direction, is reflected by the beam splitting side, wherein the polarizing beam splitter comprises a polarizing beam splitting film and a polarizing film, wherein the polarizing beam splitting film is configured in such a way that light polarized in the first direction is allowed to be transmitted therethrough and light polarized in the second direction is reflected, wherein the polarizing film is configured in such a way that light polarized in the first direction is allowed to be transmitted therethrough and light polarized in the second direction is absorbed, and wherein viewed in a direction of the light emitted from the image source, the polarizing beam splitting film is located upstream of the polarizing film to define the beam splitting side;
a polarizer disposed between the image source and the beam splitting side of the polarizing beam splitter, and wherein the polarizer is configured in such a way that light polarized in the second direction is allowed to be transmitted therethrough and light polarized in the first direction is allowed to be absorbed;
a wave plate adjacent to the beam splitting side, wherein the light emitted from the image source is allowed to be partially reflected by the beam splitting side toward the wave plate;
a semi-reflector located downstream of the wave plate in an optical path of the reflected light; and
an additional wave plate and an additional polarizer which are sequentially located distal to the semi-reflector, wherein the additional wave plate is configured in such a way that when circularly polarized light is incident on the additional wave plate, linearly-polarized light is allowed to come out of it, and the additional polarizer is configured to absorb coming out linearly-polarized light;
wherein the image source comprises a planar image source for emitting light, wherein a plane where the beam splitting side of the beam splitter component locates is at a first angle ($\beta$) relative to a normal of the image source, the first angle has a value between 11° and 79°; and/or, wherein a plane where the beam splitting side of the beam splitter component locates is at a second angle ($\alpha$) relative to an optical axis of the semi-reflector, in which 0<the second angle ($\alpha$)<90° and the first angle ($\beta$)−10°≤the second angle ($\alpha$)≤the first angle ($\beta$)+10°.

2. The optical system as recited in claim 1, wherein the polarizer is integrated within the image source.

3. The optical system as recited in claim 1, wherein the wave plate is a retarder film covering on a proximal surface of the semi-reflector.

4. The optical system as recited in claim 1, wherein the image source comprises a controlled image source configured to emit light and a lens configured to focus emitted light, and the polarizer is located between the image source and the lens.

5. The optical system as recited in claim 4, wherein the image source, the polarizer and the lens are adhered together.

6. The optical system as recited in claim 1, wherein the image source comprises a controlled image source configured to emit light and a lens configured to focus emitted light, and the lens is located between the image source and the polarizer.

7. The optical system as recited in claim 4, wherein the image source comprises a matching lens located between the image source and the lens, and the polarizer is located at one of a first position between the image source and the matching lens and a second position between the matching lens and the lens.

8. The optical system as recited in claim 7, wherein the image source, the matching lens, the polarizer and the lens are adhered together.

9. The optical system as recited in claim 1, wherein the additional wave plate and the additional polarizer are adhered together.

10. The optical system as recited in claim 1, wherein the semi-reflector is a curved semi-reflector, and the additional wave plate and the additional polarizer are shaped in a lateral direction to adapt to a curved shape of the semi-reflector.

11. The optical system as recited in claim 1, wherein the semi-reflector is a curved semi-reflector, and the additional wave plate and the additional polarizer are shaped in a longitudinal direction perpendicular to the lateral direction to adapt to a curved shape of the semi-reflector.

12. The optical system as recited in claim 1, wherein the semi-reflector is a curved semi-reflector, and the additional wave plate and the additional polarizer are shaped to adapt to a curved shape of the semi-reflector.

13. The optical system as recited in claim 1, wherein the optical system comprises a transparent protection sheet located distal to the additional polarizer, and the transparent protection sheet is one of a light energy attenuation sheet, a photochromic sheet, and an electrochromic sheet.

14. The optical system as recited in claim 1, wherein the additional wave plate is configured in such a way that when circularly polarized light is incident on it, a polarized light component, having polarization in a first direction, is transmitted therethrough, and the additional polarizer is configured in such a way that the polarized light component, having polarization in the first direction, is absorbed.

15. The optical system as recited in claim 1, wherein the additional wave plate is configured in such a way that when circularly polarized light is incident on it, a polarized light component, having polarization in a second direction, is transmitted therethrough, and the additional polarizer is configured in such a way that the polarized light component, having polarization in the second direction, is absorbed.

16. The optical system as recited in claim 1, wherein the semi-reflector comprises a transparent substrate and a semi-reflective film covering on a surface of the substrate.

17. The optical system as recited in claim 16, wherein the surface of the substrate is a proximal surface thereof, and the additional wave plate is an additional retarder film covering on a distal surface of the substrate, and the additional polarizer is an additional polarizing film covering on a distal surface of the additional retarder film.

18. The optical system as recited in claim 16, wherein the surface of the substrate is the distal surface thereof, and the additional wave plate is the additional retarder film covering on the distal surface of the substrate, and the additional polarizer is an additional polarizing film covering on the distal surface of the additional retarder film.

19. An optical system for an augmented reality apparatus, comprising:
   an image source;
   a polarizing beam splitter, comprising:
      a polarizing beam splitting film configured in such a way that light polarized in the first direction is allowed to be transmitted therethrough and light polarized in the second direction is reflected;
      a polarizing film configured in such a way that light polarized in the first direction is allowed to be transmitted therethrough and light polarized in the second direction is absorbed, and wherein viewed in a direction of the light emitted from the image source, the polarizing beam splitting film is located upstream of the polarizing film to define a beam splitting side; and
      a splitter substrate, wherein the polarizing film is located between the splitter substrate and the polarizing beam splitting film, and wherein a transmission side is defined by the splitter substrate;
   a polarizer disposed between the image source and the beam splitting side of the polarizing beam splitter, and wherein the polarizer is configured in such a way that light polarized in the second direction is allowed to be transmitted therethrough and light polarized in the first direction is allowed to be absorbed;
   a wave plate adjacent to the beam splitting side, wherein the light emitted from the image source is allowed to be partially reflected by the beam splitting side toward the wave plate;
   a semi-reflector located at a distal side of the wave plate; and
   an additional wave plate and an additional polarizer which are sequentially located at a distal side of the semi-reflector, wherein the additional wave plate is configured in such a way that when circularly polarized light is incident on the additional wave plate, linearly-polarized light is allowed to come out of it, and the additional polarizer is configured to absorb coming out linearly-polarized light;
   wherein the image source comprises a planar image source for emitting light, wherein a plane where the beam splitting side of the beam splitter component locates is at a first angle ($\beta$) relative to a normal of the image source, the first angle has a value between 11° and 79°; and/or, wherein a plane where the beam splitting side of the beam splitter component locates is at a second angle ($\alpha$) relative to an optical axis of the semi-reflector, in which 0<the second angle ($\alpha$)<90° and the first angle ($\beta$)−10°≤the second angle ($\alpha$)≤the first angle ($\beta$)+10°.

20. An augmented reality apparatus, comprising:
   a frame; and
   an optical system integrated in the frame, wherein the optical system comprises:
   an image source;
   a polarizing beam splitter, comprising:
      a polarizing beam splitting film configured in such a way that light polarized in the first direction is allowed to be transmitted therethrough and light polarized in the second direction is reflected;
      a polarizing film configured in such a way that light polarized in the first direction is allowed to be transmitted therethrough and light polarized in the second direction is absorbed, and wherein viewed in a direction of the light emitted from the image source, the polarizing beam splitting film is located upstream of the polarizing film to define a beam splitting side; and
      a splitter substrate, wherein the polarizing film is located between the splitter substrate and the polarizing beam splitting film, and wherein a transmission side is defined by the splitter substrate;
   a polarizer disposed between the image source and the beam splitting side of the polarizing beam splitter, and wherein the polarizer is configured in such a way that light polarized in the second direction is allowed to be transmitted therethrough and light polarized in the first direction is allowed to be absorbed;
   a wave plate adjacent to the beam splitting side, wherein the light emitted from the image source is allowed to be partially reflected by the beam splitting side toward the wave plate;
   a semi-reflector located at a distal side of the wave plate; and
   an additional wave plate and an additional polarizer which are sequentially located at a distal side of the semi-reflector, wherein the additional wave plate is configured in such a way that when circularly polarized light is incident on the additional wave plate, linearly-polarized light is allowed to come out of it, and the additional polarizer is configured to absorb coming out linearly-polarized light;
   wherein the image source comprises a planar image source for emitting light, wherein a plane where the beam splitting side of the beam splitter component locates is at a first angle ($\beta$) relative to a normal of the image source, the first angle has a value between 11° and 79°; and/or, wherein a plane where the beam splitting side of the beam splitter component locates is at a second angle ($\alpha$) relative to an optical axis of the semi-reflector, in which 0<the second angle ($\alpha$)<90° and the first angle ($\beta$)−10°≤the second angle ($\alpha$)≤the first angle ($\beta$)+10°.

* * * * *